US007020714B2

(12) United States Patent

Kalyanaraman et al.

(10) Patent No.: US 7,020,714 B2
(45) Date of Patent: Mar. 28, 2006

(54) SYSTEM AND METHOD OF SOURCE BASED MULTICAST CONGESTION CONTROL

(75) Inventors: Shivkumar Kalyanaraman, Albany, NY (US); Neelkanth Natu, Troy, NY (US); Priya Rajagopal, Troy, NY (US); Puneet Thapliyal, Troy, NY (US); Fnu Sidhartha, Troy, NY (US); Jiang Li, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 207 days.

(21) Appl. No.: 10/240,323

(22) PCT Filed: Apr. 6, 2001

(86) PCT No.: PCT/US01/11119

§ 371 (c)(1), (2), (4) Date: Jul. 30, 2003

(87) PCT Pub. No.: WO01/77850

PCT Pub. Date: Oct. 18, 2001

(65) Prior Publication Data

US 2004/0049593 A1 Mar. 11, 2004

Related U.S. Application Data

(60) Provisional application No. 60/195,553, filed on Apr. 6, 2000, provisional application No. 60/247,027, filed on Nov. 9, 2000.

(51) Int. Cl.
*G06F 15/16* (2006.01)

(52) U.S. Cl. ..................... 709/235; 709/233; 709/234; 370/231; 370/235

(58) Field of Classification Search ........ 709/230–235; 370/229–238.1; 714/748–752
See application file for complete search history.

(56) References Cited

U.S. PATENT DOCUMENTS

| | | | | |
|---|---|---|---|---|
| 5,193,151 | A * | 3/1993 | Jain | 709/237 |
| 5,243,596 | A | 9/1993 | Port et al. | |
| 5,313,454 | A * | 5/1994 | Bustini et al. | 370/231 |
| 5,838,687 | A | 11/1998 | Ramfelt | |
| 5,960,002 | A | 9/1999 | Ramfelt et al. | |
| 5,982,780 | A | 11/1999 | Bohm et al. | |
| 6,038,230 | A | 3/2000 | Ofek | |
| 6,148,005 | A | 11/2000 | Paul et al. | |
| 6,151,300 | A | 11/2000 | Hunt et al. | |
| 6,212,582 | B1 | 4/2001 | Chong et al. | |
| 6,424,624 | B1 * | 7/2002 | Galand et al. | 370/231 |
| 6,424,626 | B1 * | 7/2002 | Kidambi et al. | 370/236 |
| 6,643,259 | B1 * | 11/2003 | Borella et al. | 370/231 |

* cited by examiner

*Primary Examiner*—William C. Vaughn, Jr.
(74) *Attorney, Agent, or Firm*—Dickstein Shapiro Morin & Oshinsky LLP

(57) ABSTRACT

The present invention provides for a method of congestion control for multicast transmission that is entirely managed at the source of the transmission. The various types of filters as well as round trip time estimators (130) that are used in the invention to determine when the rate of the multicast transmission should be reduced to alleviate congestion. The source of the transmission adjusts the rate of transmission based on loss indications that the receivers would otherwise transmit.

17 Claims, 8 Drawing Sheets

SYSTEM AND METHOD OF SOURCE BASED MULTICAST CONGESTION CONTROL

CROSS-REFERENCE TO RELATED APPLICATIONS

This application is a 371 of PCT/US01/11119 filed Apr. 6, 2001 which claims benefit of U.S. Provisional Patent Application Ser. No. 60/195,553 filed on Apr. 6, 2000 which claims benefit of U.S. Provisional Patent Application 60/247,027 filed Nov. 9, 2000.

FIELD OF THE INVENTION

The present invention involves a system and method of source-based multicast congestion control.

BACKGROUND OF THE INVENTION

As a greater number of people begin to access the Internet through high speed connections, the content offered is expanding. Video and audio broadcasting over the internet is extremely appealing because the potential audience is extremely large and the cost of broadcasting is far less than traditional broadcasting methods. One method of broadcasting video and audio streams over the Internet is Multicasting.

Multicasting is one of the types of packets that the Internet Protocol Version 6 ("IPv6") supports. It is communication between a single source and multiple receivers on a network. Unicast, the more common method of transmission over the Internet, is communication between a single source and single receiver. Multicasting is used to send files to multiple users at the same time somewhat as radio and TV programs are broadcast to many people at the same time. Typical uses of multicast include audio/video streaming and periodic issuance of online newsletters.

The multicast backbone ("MBone") uses a of a portion of the Internet for Internet Protocol multicasting. The MBone consists of servers that are equipped to handle multicast protocol. An MBone router that is sending a packet to another MBone router through a non-MBone part of the Internet encapsulates the multicast packet as a unicast packet. The non-MBone routers simply see an ordinary packet. The destination MBone router unencapsulates the unicast packet and forwards it appropriately.

It is important that the MBone's use of the portions of the Internet that are not equipped to handle multicast protocol be Transmission Control Protocol ("TCP") friendly. TCP is a protocol used along with IP to send data in the form of message units between computers over the Internet. While IP handles the actual delivery of the data, TCP keeps track of the individual units of data (packets) that a message is divided into for efficient routing through the Internet. When a multicast transmission is sent over a portion of the Internet that is not equipped to handle multicast protocol, the transmission of packets should be at the same rate that TCP would transmit them. This is called a TCP-friendly transmission rate. An method of transmission is "TCP-friendly" if it has a congestion control scheme that maintains the arrival rate of packets at some constant over the square root of the packet loss rate.

The various multicast protocols provide methods of insuring that each packet transmitted is received. One such method entails the recipient sending an acknowledgment signal to the source when the recipient receives each packet so that the source can determine that a packet was not received if an acknowledgment signal is not received. The problem with using acknowledgement signals to determine if each transmitted packet was received for multicast signals arises when there are many recipients, as is usually the cast with multicast transmissions. In such a case, the large number of acknowledgement signals sent for each packet would cause a great deal of congestion over the Internet.

One method of reducing the congestion caused by multicast signals on the Internet, such as the method used in Pragmatic General Multicast ("PGM"), is the use of negative acknowledgement signals. In this case, when the recipient does not receive a packet that it is supposed to receive, a negative acknowledgement signal is sent to the source so that the packet can be retransmitted. While this method greatly reduces the traffic from the recipients to the source when there are low errors, it causes a great deal of congestion when many recipients are experiencing errors.

A second method of reducing the congestion caused by multicast signals on the Internet is to use aggregators. Aggregators will aggregate the various acknowledgement signals or negative acknowledgement signals into a single combined signal at the routers. This reduces the congestion problem, but it requires additional infrastructure (i.e. routers that can aggregate signals).

A third method of reducing the congestion caused by multicast signals on the Internet is to use statistical or round-robin selection of receivers to send control traffic. For statistical selection of receivers to send control traffic, those receivers that are statistically more likely to receive errors transmit control traffic (i.e. acknowledgment or negative acknowledgement signals) more often than those receivers that do not experience errors as often. While this reduces the congestion problem, it also reduces the accuracy of the error detection.

As can be seen from above, the task of providing reliable multicasting outside of the MBone causes a great deal of undesired congestion on the Internet or requires additional infrastructure. Therefore, there exists a need in the art for a system and method of congestion control for multicast transmissions that is implemented entirely at the source of the transmission without any modifications to the receivers or routers.

SUMMARY AND OBJECTS OF THE INVENTION

Briefly, the present invention addresses the above-noted gaps. In contrast with the solutions discussed above, the present invention provides a method of congestion control for multicast transmissions that is entirely implemented at the source of the transmission. Various types of filters as well as a round trip time estimator are used to determine when the rate of the multicast transmission should be reduced to alleviate congestion.

It is, therefore, an object of the present invention to provide a method of controlling congestion generated by multicast transmissions implemented entirely at the source of the transmission.

It is further an object of this invention to provide a computer system source-based multicast congestion control comprising a processor, a computer memory, a communications system, and a multicast congestion control program. The multicast congestion control program adjusts the rate at which the processor multicasts a transmission based solely on signals the receivers would transmit without any modification.

It is another object of the present invention to provide a multicast congestion control program that comprises a round trip time estimator, a loss indication to loss event filter, a maximum linear proportional response filter, an adaptive time filter, and an additive increase multiplicative decrease module. The loss indication to loss event filter, the maximum linear proportional filter, and the adaptive time filter each receive estimates of the round trip time of the multicast from the round trip time estimator. The rate is decreased when the loss indication to loss event filter converts a loss indication to a loss event and forwards the loss event to the maximum linear proportional filter, the maximum linear proportional forwards to the adaptive time filter loss events that meet a threshold probability, the adaptive time filter eliminates excess loss events, and the additive increase multiplicative decrease module decrease the rate of transmission by half when it receives a loss event It is further an object of the present invention that the round trip time estimator also estimates the standard deviation of the round trip time.

It is yet another object of the present invention that the round trip time estimator also estimates the smoothed round trip time.

It is further an object of the present invention that the smoothed round trip time is the round trip time plus one eighth of the smoothed round trip time minus the round trip time.

It is another object of the present invention that the round trip time is the round trip time for a congested subtree of the multicast.

It is yet another object of the present invention that the loss indication to loss event filter convert a loss indication to a loss event when the time since the previous loss event was passed to said maximum linear proportional response filter is greater than the smoothed round trip time plus twice the standard deviation.

It is further an object of the present invention that the maximum linear proportional response filter sends a loss event to the adaptive time filter if it meets a threshold probability of the maximum number of loss events from any receiver divided by the summation of loss events from each receiver.

It is another object of the present invention that the adaptive time filter eliminate excess loss events.

It is yet another object of the present invention that the method of multicast congestion control is implemented as hardware.

It is further object of the present invention that the method of multicast congestion control is implemented as software.

BRIEF DESCRIPTION OF THE DRAWINGS

The foregoing brief description as well as further objects, features and advantages of the present invention will be understood more completely from the following detailed description of the presently preferred, but nonetheless illustrative embodiments of the invention, with reference being had to the accompanying drawings, in which.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention. It is to be understood that structural changes may be made and equivalent structures substituted for those shown without departing from the spirit and scope of the present invention.

The present invention comprises a system and method of controlling congestion created by multicasting implemented entirely at the source of the multicast.

Figure 1A:
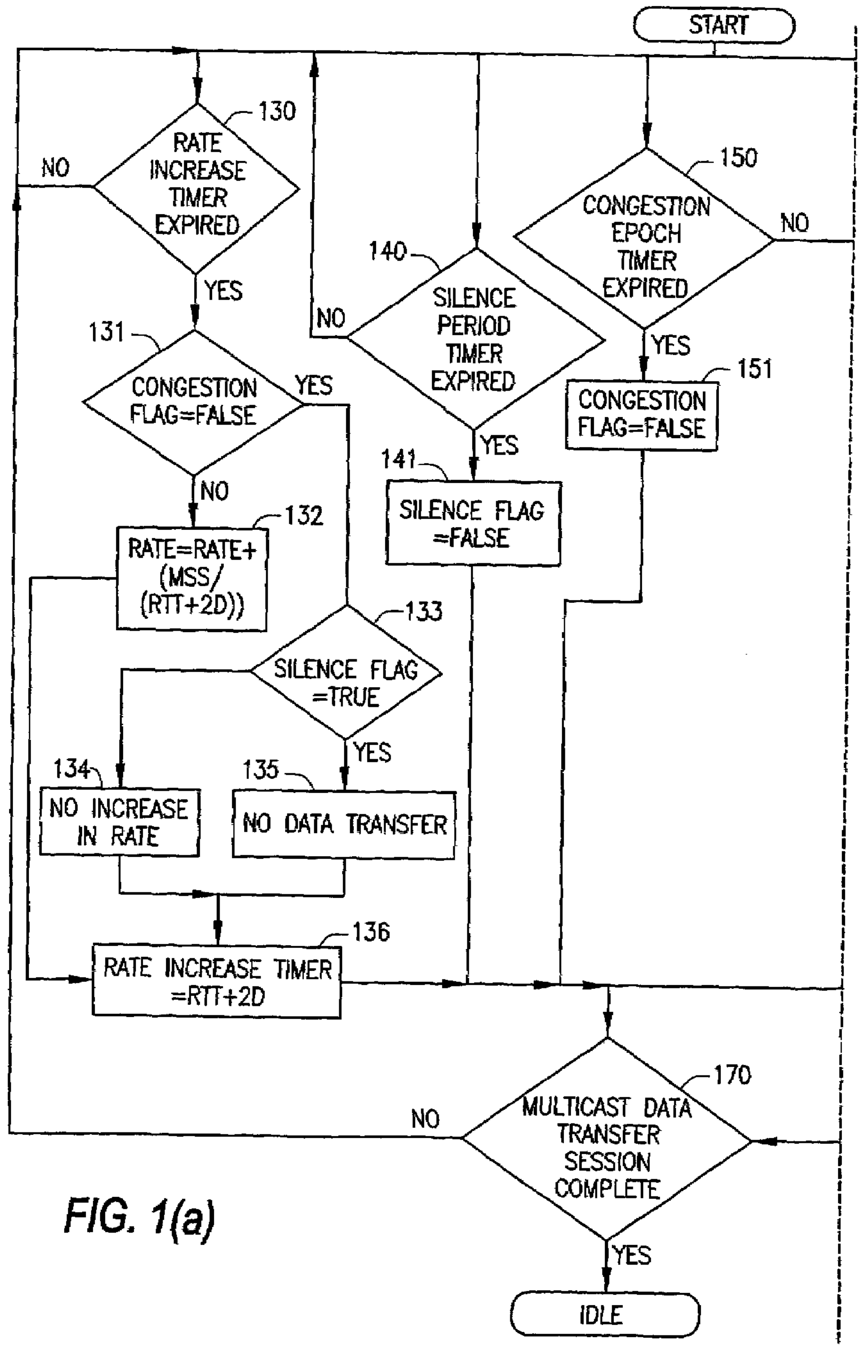
FIG. 1 is a flowchart of the operation of a method of source-based multicast congestion control.
Figure 1B:
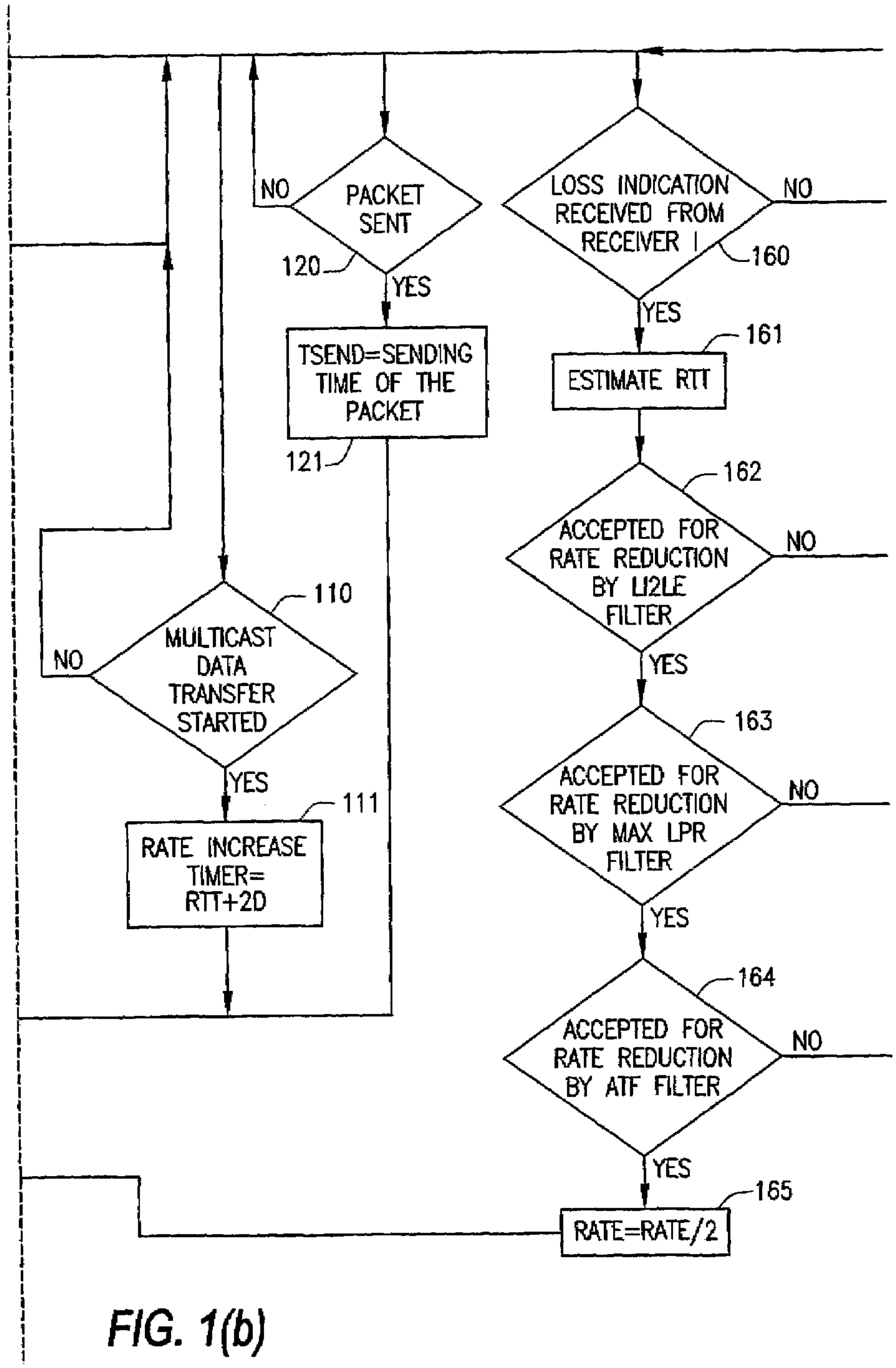
Figure 2:
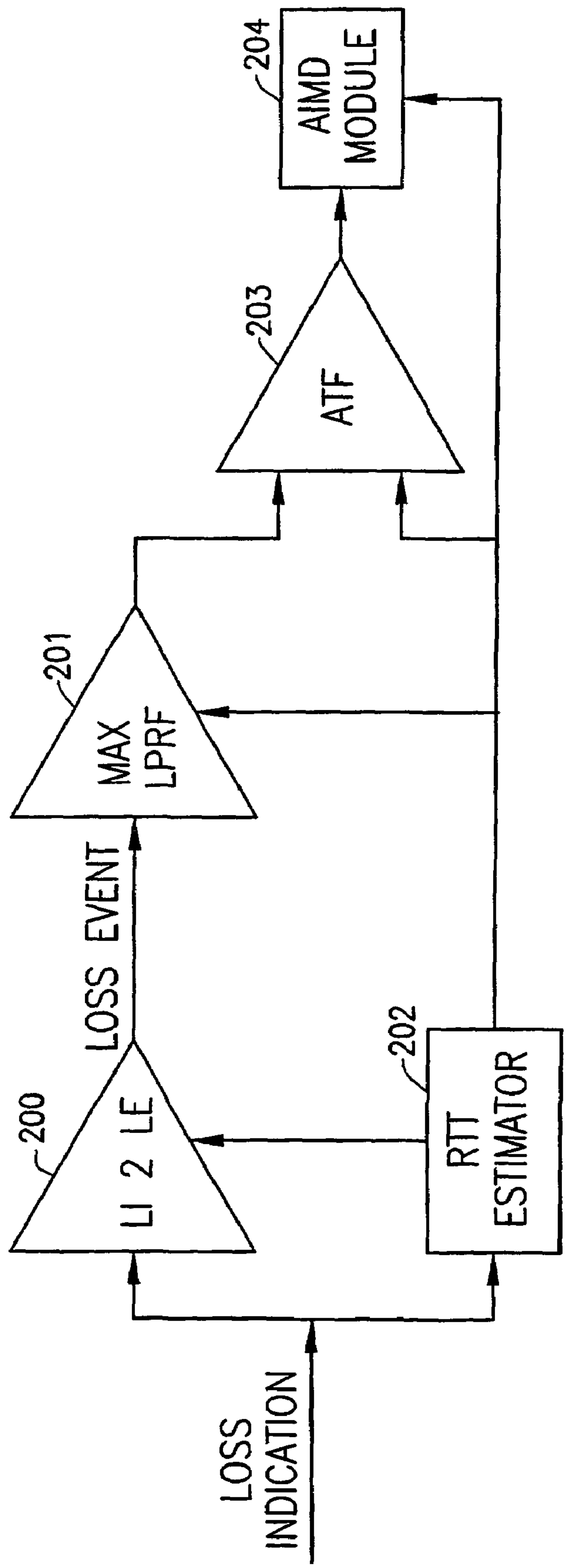
FIG. 2 is a block diagram of the operation of the rate reduction portion of a method of source-based multicast congestion control.
Figure 3:
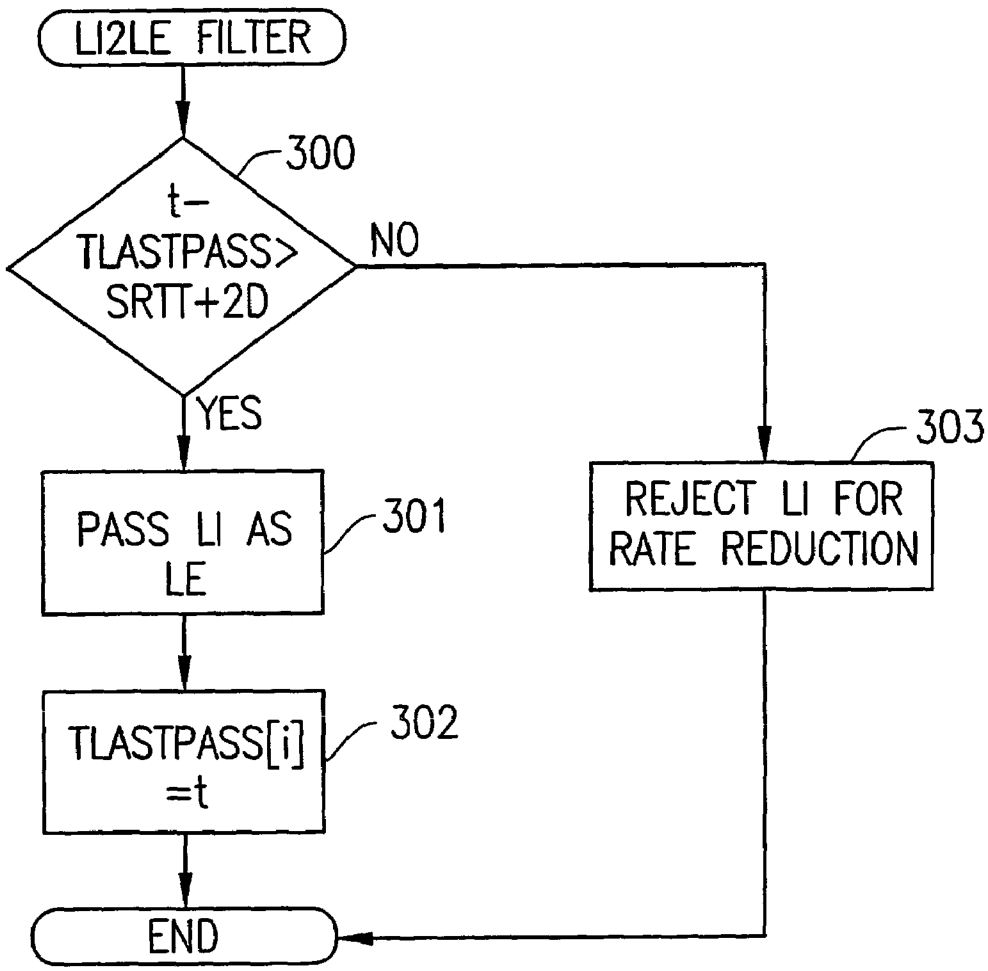
FIG. 3 is a flowchart of the operation of a loss indication to loss event filter.
Figure 4:
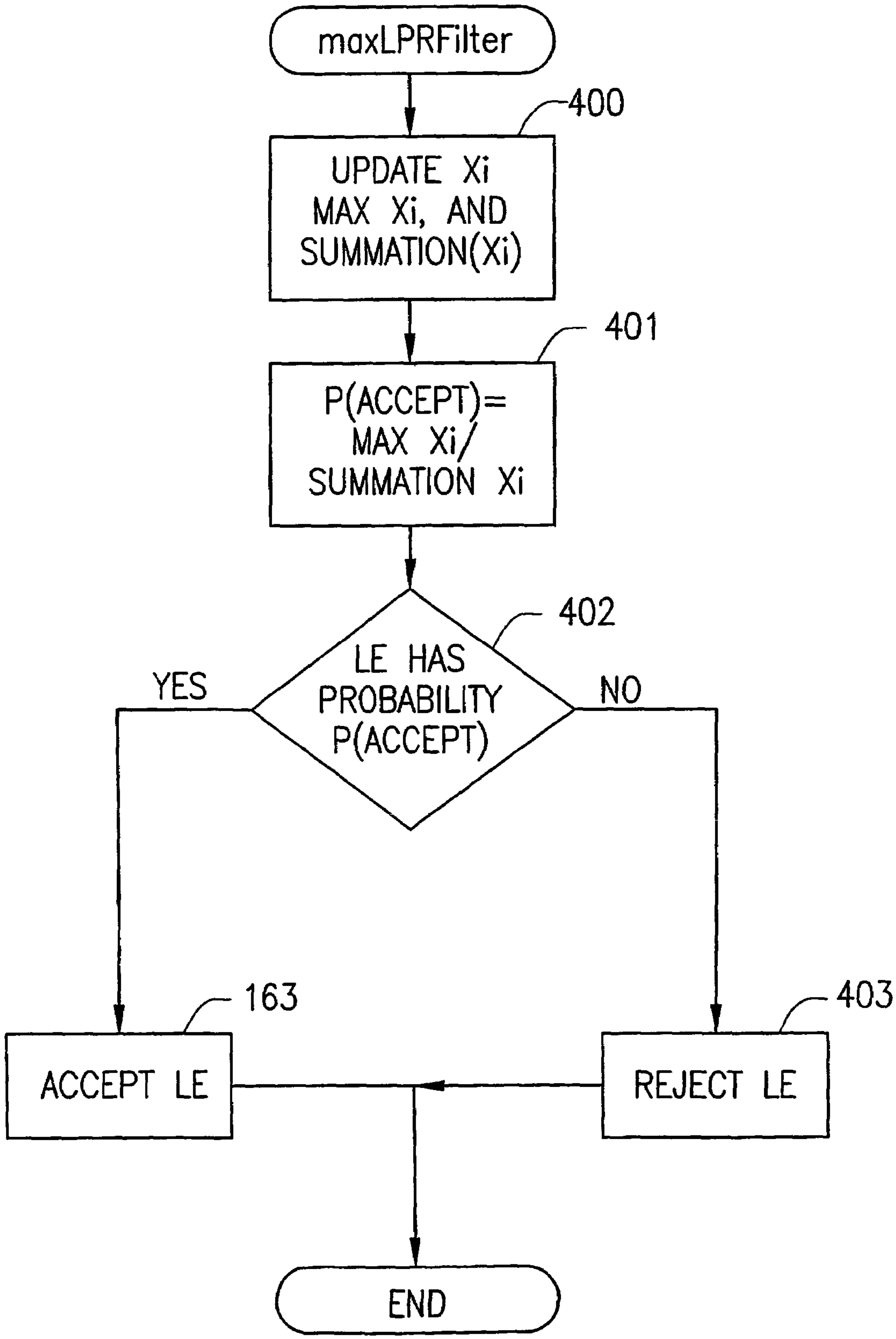
FIG. 4 is a flowchart of the operation of a maximum linear proportional response filter.
Figure 5:
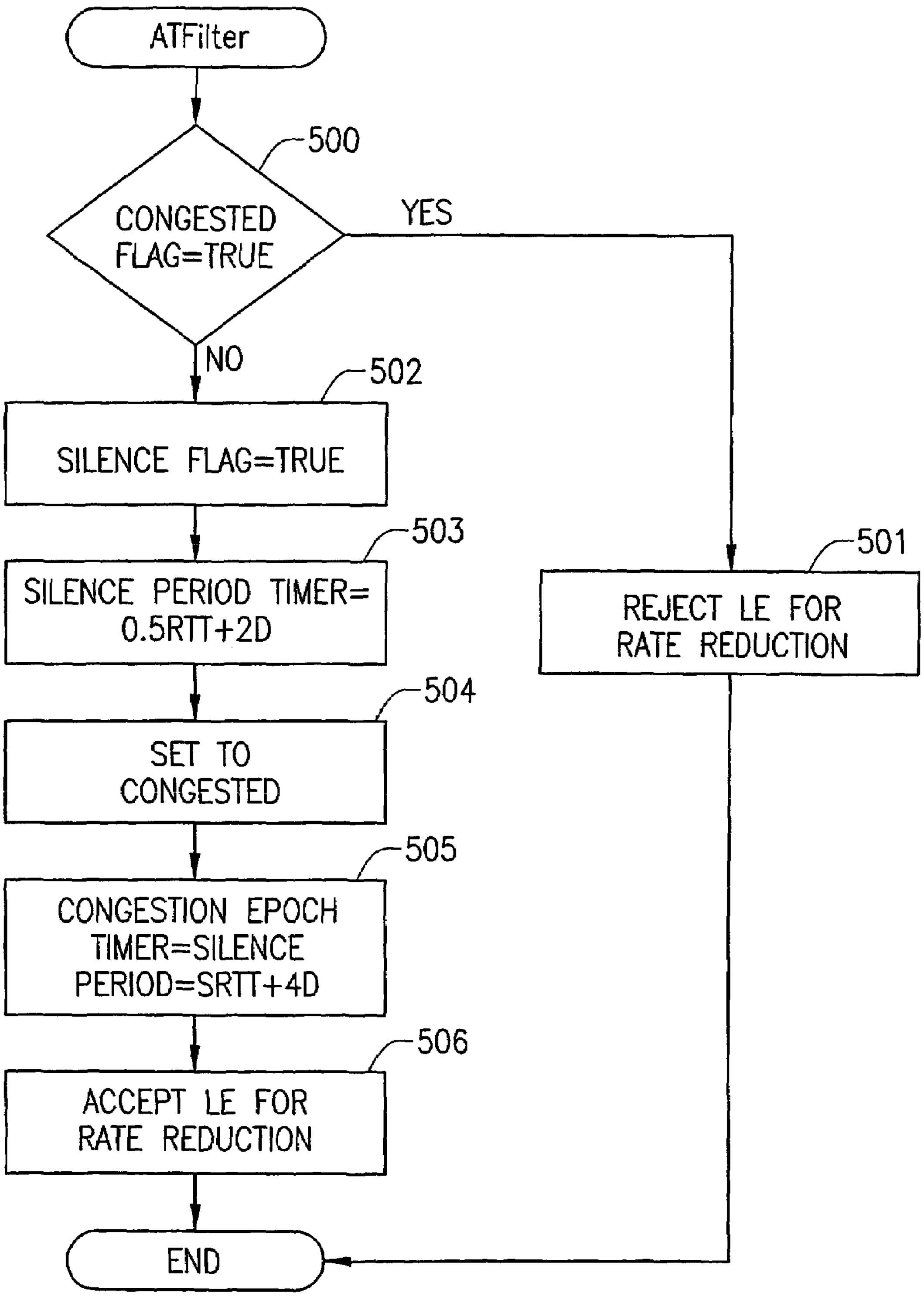
FIG. 5 is a flowchart of the operation of an adaptive time filter.
Figure 6:
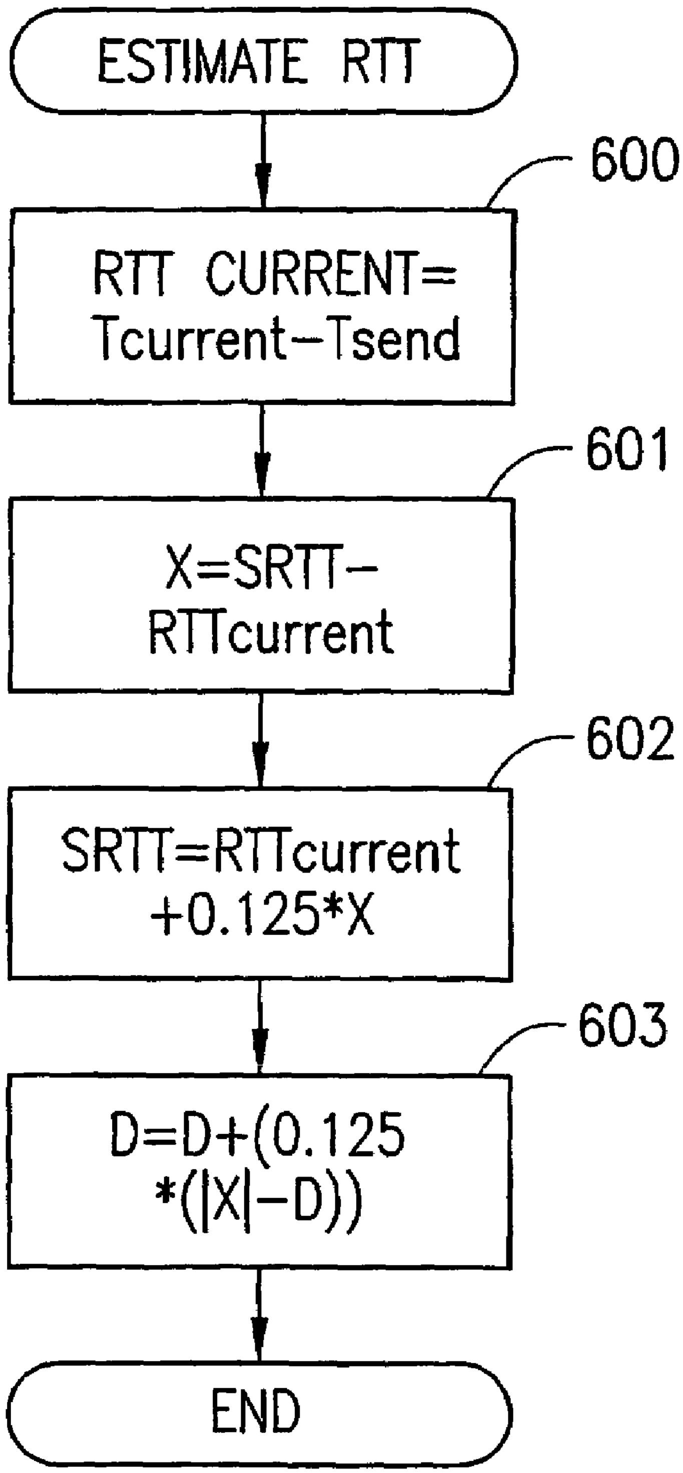
FIG. 6 is a flowchart of the operation of a round trip time estimator

FIG. 1 illustrates the functional and logical topology of the preferred embodiment of the present invention. It is understood that those skilled in the art will know that components illustrated in FIG. 1 can be realized as hardware or software functional components.

In a preferred embodiment of the present invention, a method of congestion control is implemented for a multicast data transfer session entirely at the source of the data transfer session. This method can function without any new support from receivers, network elements or packet-header support and can leverage the underlying loss indications provided by various multicast protocols. A system implementing a negative acknowledgment ("NAK") driven reliable multicast transport ("RMT"), such as, Pragmatic General Multicast ("PGM"), is illustrated below. The present invention, however, can also be implemented with other multicast protocols using different types of feedback, such as, for example, acknowledgment signals and hierarchical acknowledgment signals.

The present invention consists of a purely source-based cascaded set of filters and Round Trip Time ("RTT") estimation modules feeding into a rate-based Additive Increase/Multiplicative Decrease ("AIMD") module as illustrated in FIG. 1. The filters are designed to address the Drop-to-Zero problem and TCP-unfriendliness.

Drop-to-Zero is the problem of reacting to more loss indications ("LIs") than is necessary leading to an extreme slowdown of the multicast's flow rate. This occurs because the multicast flow receives LIs from multiple paths and may not filter LIs sufficiently. TCP-unfriendliness is the problem of reacting to less LIs than a hypothetical TCP flow would on the worst loss path.

Figure 7:
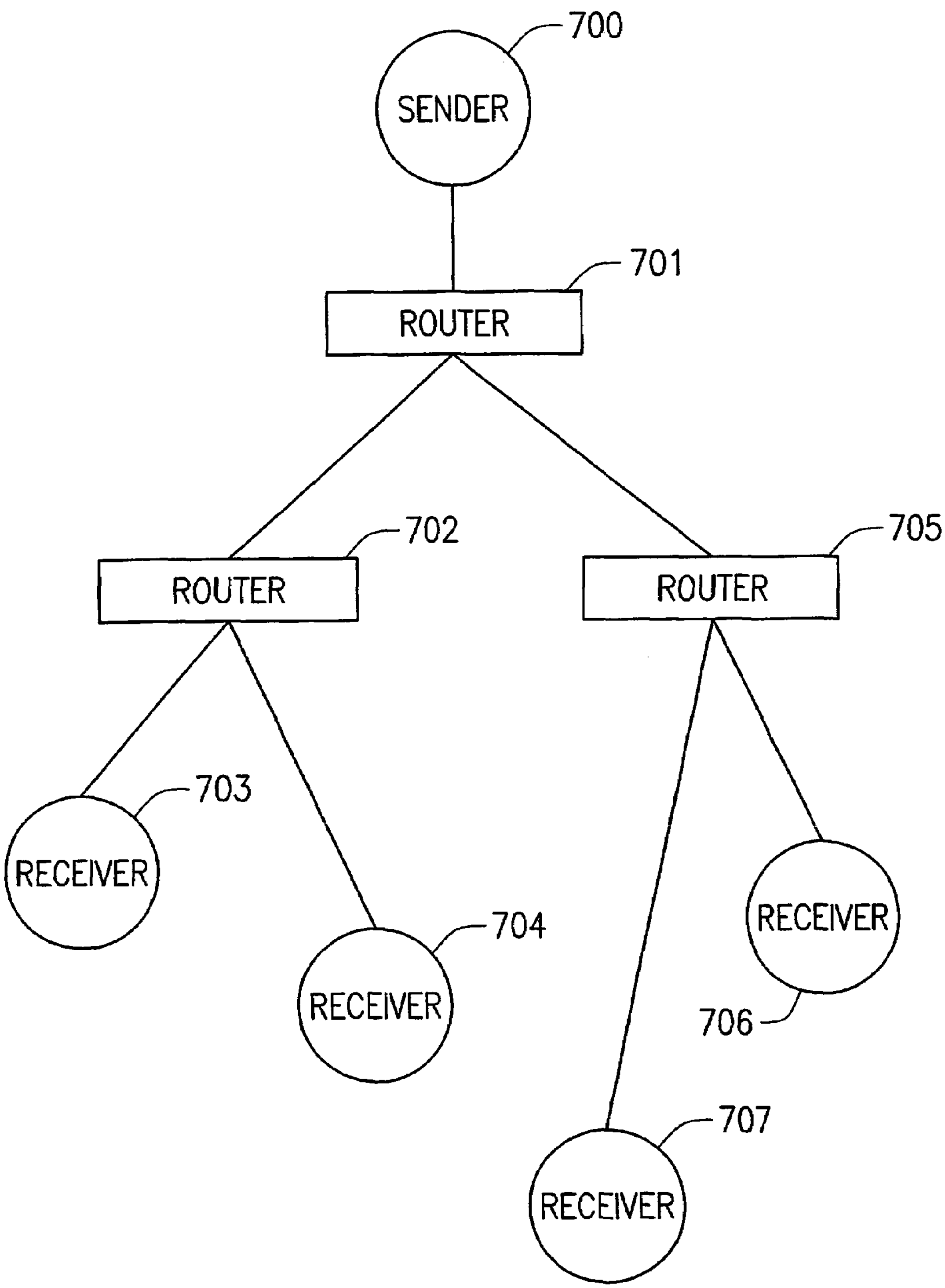
FIG. 7 is a block diagram of a multicast transmission tree.

When a multicast data transfer session is started 110, as shown in FIG. 1, the rate increase timer is set to the round trip time ("RTT")+twice the standard deviation ("D") from the RTT 111. The RTT is the amount of time it takes for a transmission to go from the source 700, as shown in FIG. 7, to receivers 703, 704, 706, and 707 plus the time for a NAK to go from receivers 703, 704, 706, and 707 to source 700. The RTT estimate is calculated based on a congested subtree and not the entire tree. A congested subtree includes all paths from Source 700 to receivers which have at least one bottleneck, i.e. points where demand outstrips capacity. Thus, the true RTT of the entire tree is not being measured. Instead, the RTT of the congested subtree is being measured because it is operationally useful in setting the congestion epoch and leads to robust stability.

Once the multicast data transfer is started 110, source 700 sends a packet 120. The variable Tsend is set to the sending time of the packet 121 to keep track of how long it has been since the packet has been sent.

When the rate increase timer expires 130, the transmission rate should be increased. Rate increases are performed in the absence of new NAKs. When there are no new NAKs, the rate is increased by MSS (a constant) divided by RIT+2D 132. An important question is "how long should the rate-increase timer be set for?" In congestion avoidance phase (steady state) TCP increases its window by a constant (MSS) approximately once per RTT. In the present invention, if the congestion flag is set to false (i.e. not congested) 131, the rate-increase timer is set to RTT+2D 136. Once again, RTT represents the RIT of the congested subtree because it is that portion of the tree which needs to respond to the rate-increase (i.e. signal if the rate increase has resulted in congestion).

If the congestion flag is set to true (i.e. congested) 131, the state of the silence flag becomes important. A silence flag, as well as a silence timer, is used to alleviate the retransmission ambiguity problem. When a retransmission is sent and NAKs are received it is ambiguous whether the RTT samples belong to the original transmission or due to retransmission. To counter this problem, a timestamp is not recorded when a packet is retransmitted (such as Tsend when a packet is initially transmitted). Instead, a silence period of RTT/2 is set just after the rate reduction has been effected in addition to the regular setting of the congestion epoch.

If the silence flag is set to true 133, there is no data transfer 135. If the silence flag is set to false 133, there is no increase in rate 134. In either case, the rate increase timer is set to RTT+2D 136. If the silence timer expires 140, the silence flag is set to false 141.

If the congestion epoch timer expires 150, the congestion flag is set to false (i.e. not congested). Congestion epochs are important in addressing the drop-to-zero problem because the number of congestion epochs detected during congestion is equal to the total number of rate reductions. The first new NAK received after the end of a congestion epoch is an indication that the source rate is still larger than the minimum bottleneck rate of the tree. It therefore triggers a new congestion epoch and corresponding rate-reduction.

When a loss indication is received from receiver(i) 160, RTT is estimated 161. Next, the Loss Indicator to Loss Event Filter ("LI2LEfilter") 200 is accessed. If the LI2LE filter 200 accepts the loss indication for rate reduction 162, the maxLPRFilter 201 is accessed. If the maxLPRFilter 201 accepts the loss indication for rate reduction 163, the ATFilter 203 is accessed. If the ATFilter 203 accepts the loss indication for rate reduction 164, then the rate is halved 165.

All filters and the AIMD module 204 need RTT estimates which are fed by the RTT estimator 202. The RTT estimator 202 works similarly to the TCP timeout procedure (i.e. it calculates a smoothed RTT (SRTT) and a mean deviation which approximates the standard deviation). However, the set of samples is pruned to exclude a large fraction of samples which are smaller than 0.5SRTT (i.e. smaller by an order of magnitude) to bias the average RTT higher.

To estimate the RTT and D, the RIT estimator 202 performs the following calculations:

$$RTT_{current}=T_{current}-T_{send[j]} \quad 600$$

$$\delta=SRTT-RTT_{current} \quad 601$$

$$SRTT-RTT_{current}T+0.125*\delta \quad 602$$

$$D=D+(0.125*(|\delta|-D)) \quad 603$$

The LI2LE filter 200 converts per-receiver loss indications ("Lis") into per-receiver loss events ("LEs"). A LE is a per-receiver binary number which is 1 when one or more LIs are generated per RTT per receiver, and 0 otherwise. The LI2LE filter 200 accepts a LI for rate reduction 162, if a new LI arrives from the receiver after a period SRTT+2D 300. In this case, the LI is converted into a LE and passed 301 and the timestamp $T_{LastPassed}$ is updated to the current time 302. Otherwise, the LIs are filtered 303 (i.e. nothing happens).

The maxLPRFilter 201 is a probabilistic filter that takes as input all the LEs from receivers ($\Sigma_i X_i$) and on the average passes the maximum number of LEs from any one receiver (i.e. $\max_i X_i$). The maxLPRFilter 201 tracks the worse path better than a LPR-Filter and is the crucial building block for drop-to-zero avoidance. It operates on per-receiver LE counts since they differ dramatically from LI counts in drop-tail networks with no self-clocking.

When the maxLPRFilter 201 receives a LE, it updates $X_i$, max $X_i$, and $\Sigma X_i$ 400. The threshold probability P(accept) is then set to max $X_i/\Sigma X_i$ 401. The maxLPRFilter 201 then checks if the LE has a probability of P(accept) 402. If the LE has a probability of P(accept), the LE is accepted for rate reduction 163. If the LE does not have a probability of P(accept), the LE is rejected for rate reduction 403.

The ATFilter 203 drops excess LEs passed by maxLPR-Filter 201 in any RTT to enforce at most one rate reduction per SRTT+4D. In addition, the ATFilter 203 also imposes an optional silence period of 0.5(SRTT+4D) when no packets are sent. The goal is to reduce the probability of losing any control traffic or retransmissions during this phase.

The ATFilter 203 determines if a LE is accepted for a rate reduction 164 by filtering any LEs 501 that are passed while the congestion flag is set to true 500. If the congestion flag is not set to true 500 when an LE is passed, the silence flag is set to true 502, the silence period timer is set to 0.5RTT+2D 503, the congestion flag is set to true 504, the congestion epoch timer is set to the silence period +SRTT+4D 505, and the LE is accepted 506.

Finally, the AIMD module 204 reduces the rate by half 165 when a LE is accepted by the LI2LE filter 200, the maxLPRFilter 201, and the ATFilter 203.

In general, this work is extremely useful for multicast congestion control when it is not feasible or undesirable to provide any additional functionality at receivers or routers. This system and method can be implemented entirely at the source of a multicast transmission.

The invention provides an system and method for source-based multicast congestion control. The above description and drawings are only illustrative of preferred embodiments which achieve the objects, features and advantages of the present invention. It is not intended that the present invention be limited to the illustrated embodiments as modifications, substitutions and use of equivalent structures can be made. Accordingly, the invention is not to be considered as limited by the foregoing description, but is only limited by the scope of the appended claims.

What is claimed is:

1. A computer system computer application for source-based multicast congestion control comprising: a processor; a computer memory coupled to said processor; and a communications system coupled to said processor; a multicast congestion control program stored in said computer memory, said multicast congestion control program comprising a maximum linear proportional response filter; and wherein said multicast congestion control program adjusts the rate at which said processor multicasts a transmission to a plurality of receivers based solely on signals said receivers would transmit without any modification.

2. A computer system as in claim 1, wherein said multicast congestion control program further comprises: a round trip time estimator; a loss indication to loss event filter; an adaptive time filter; and an additive increase multiplicative decrease module; wherein said loss indication to loss event filter, said maximum linear proportional filter, and said adaptive time filter each receive estimates of the round trip time of said multicast from said round trip time estimator; and wherein said rate is decreased when said loss indication to loss event filter converts a loss indication to a loss event and forwards said loss event to said maximum linear proportional response filter, said maximum linear proportional response filter forwards loss events meeting a threshold probability to said adaptive time filter, said adaptive time filter eliminates excess loss events forwarded by said maximum linear proportional filter and forwards the remaining loss events to said additive increase multiplicative decrease module, and said additive increase multiplicative decrease module decreases said rate by half whenever said additive increase multiplicative decrease module receives a loss event.

3. A computer application as in claim 2, wherein said round trip time estimator estimates standard deviation of the round trip time of said multicast as well as said round trip time.

4. A computer application as in claim 2, wherein said round trip time estimator estimates a smoothed round trip time as well as said round trip time.

5. A computer application as in claim 4, wherein said smoothed round trip time is the round trip time plus one eighth of the smoothed round trip time minus the round trip time.

6. A computer application as in claim 5, wherein said loss indication to loss event filter converts a loss indication to a loss event and forwards said loss event to said maximum linear proportional response filter when the time since the previous loss event was passed to said maximum linear proportional response filter is greater than the smoothed round trip time plus twice the standard deviation.

7. A computer application as in claim 5, wherein said maximum linear proportional filter forwards loss events to said adaptive time filter meeting a threshold probability of the maximum number of loss events from any receiver divided by the summation of loss events from each receiver.

8. A computer application as in claim 5, wherein said adaptive time filter eliminates excess loss events forwarded by said maximum linear proportional filter and forwards the remaining loss events to said additive increase multiplicative decrease module when a congestion indicator is set to false.

9. A computer application as in claim 2, wherein said round trip time is the round trip time for a congested subtree of said multicast.

10. A computer application as in claim 2, wherein said computer application is implemented as software.

11. A computer application as in claim 1, wherein said computer application is implemented in hardware.

12. A method of source-based multicast congestion control comprising the steps of: transmitting a packet of a multicast transmission over the Internet to a plurality of receivers; receiving loss indications from said receivers; estimating the round trip time, smoothed round trip time, and standard deviation of said multicast transmission; converting loss indications to loss events; deleting said loss events if said loss events fail to meet a threshold probability; deleting said loss events such that no more than one rate reduction occurs per a function of the round trip time; reducing the rate of said multicast transmission; increasing the rate of said multicast transmission if no loss indications are received in period of time defined by a function of the round trip time.

13. A method as in claim 12, wherein said smoothed round trip time is the round trip time plus one eighth of the difference between the smoothed round trip time and the round trip time.

14. A method as in claim 12, wherein said loss indications are converted to loss events when the time since the previous loss event was converted is greater than the smoothed round trip time plus twice the standard deviation.

15. A method as in claim 12, wherein said threshold probability is the maximum number of loss events from any receiver divided by the summation of loss events from each receiver.

16. A method as in claim 12, wherein said rate is reduced by half 17. A method as in claim 12, wherein said rate is increased by a constant divided by the sum of the smoothed round trip time and twice the standard deviation.

17. A method as in claim 12, wherein said rate is increased by a constant divided by the sum of the smoothed round trip time and twice the standard deviation.

* * * * *